United States Patent [19]
Evans

[11] 3,809,190
[45] May 7, 1974

[54] DISK TYPE PARKING BRAKE
[75] Inventor: Anthony C. Evans, Westland, Mich.
[73] Assignee: Kelsey-Hayes Company, Romulus, Mich.
[22] Filed: May 18, 1972
[21] Appl. No.: 254,657

[52] U.S. Cl.......................... 188/72.2, 188/79.5 GE
[51] Int. Cl............................................. F16d 55/46
[58] Field of Search............ 188/72.2, 216, 79.5 GE

[56] References Cited
UNITED STATES PATENTS
| | | | |
|---|---|---|---|
| 3,207,267 | 9/1965 | Beuchle et al. | 188/82.2 |
| 3,321,049 | 5/1967 | Swift | 188/72.2 X |
| 3,406,793 | 10/1968 | Buyze | 188/72.2 |
| 3,647,031 | 3/1972 | Burnett | 188/72.6 |

Primary Examiner—George E. A. Halvosa
Attorney, Agent, or Firm—Harness, Dickey & Pierce

[57] ABSTRACT

A disk type parking brake embodying a tilting member interposed between the mechanical actuator and the brake pad. The tilting member is adapted to pivot upon the engagement of the brake pad with the associated rotor braking surface for generating a self-energizing action to assist in the brake operation. The point of the contact of the tilting member with the brake pad is defined by an arcuate surface generated about the point of pivotal movement so that the application forces to the brake pad always pass through the same point. An automatic adjusting mechanism is also incorporated that adjusts the at-rest position of the actuator and the tilting member to compensate for wear. The tilting member is supported within a pocket and is engaged by a conical return spring.

14 Claims, 4 Drawing Figures

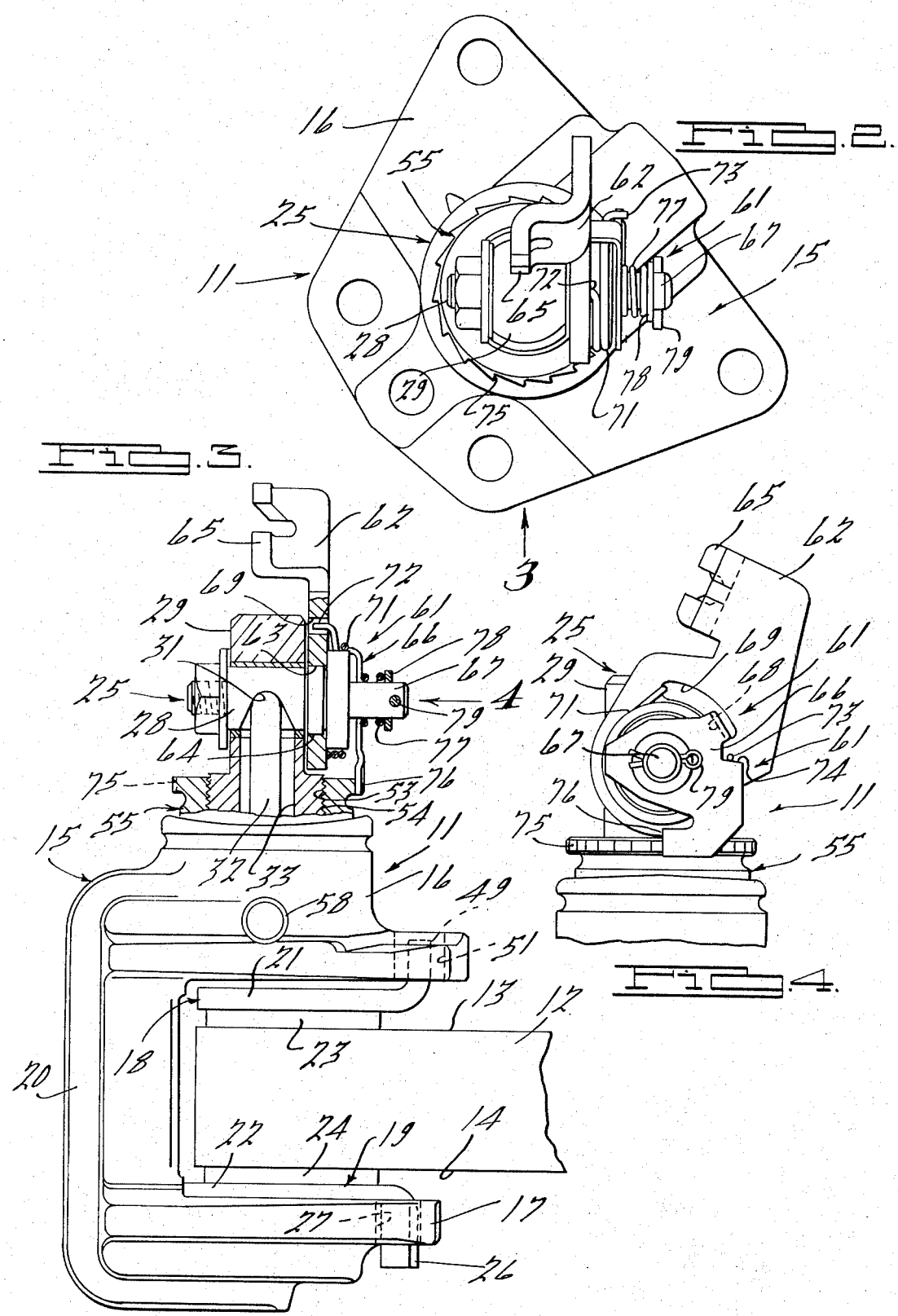

DISK TYPE PARKING BRAKE

BACKGROUND OF THE INVENTION

This invention relates to a disk type parking brake and more particularly to an improved disk type brake that incorporates a tilting pin member for a self-energization, an improved return spring mechanism, and an improved automatic adjuster.

Because of their considerable advantages over drum type brakes, disk brakes are currently enjoying considerable application in the automotive industry. The application of disk brakes has been limited, for most high production vehicles, to the front wheels. One reason that disk brakes have not enjoyed a wider degree of use with the rear wheels is the difficulty in providing an effective parking brake of the disk type. A disadvantage that manifests itself in connection with the mechanical action of such brakes is the inherent lack of self-energization. Recently it has been proposed to employ a tilting member in the actuating mechanism to provide a servo effect. The tilting member, however, inherently causes the application pressure to be applied at a different location on the brake pad, depending upon the degree of pivotal movement. This can result in an uneven wear and erratic operation.

It is, therefore, a principal object of this invention to provide an improved self-energized brake.

It is a further object of the invention to provide a self-energized brake embodying a tilting member in which the application force is applied at the same point regardless of the angular position of the tilting member.

In connection with the use of the tilting member for effecting a self-energizing force, it is necessary to provide a return spring to insure complete release of the brake. It is, therefore, a further object of this invention to provide an improved and simplified return spring arrangement for such a brake.

Although hydraulic actuated disk brakes are, to some extent self-adjusting to compensate for lining wear, this characteristic is not present in the mechanically actuated disk brake. Various arrangements have been proposed for providing automatic adjustment in connection with mechanical brakes. For the most part, these automatic adjusting mechanisms have been interposed between the actuating element and the brake pad. Thus, with this type arrangement, the automatic adjuster must transmit the actuating forces. This results in damage to the automatic adjusting mechanism and hinders the operation of the adjusting mechanism.

It is, therefore, a further feature of this invention to provide an automatic adjusting mechanism for a disk brake.

It is another object of the invention to provide an improved automatic adjusting mechanism for a brake that does not transmit actuating forces to the brake pad.

SUMMARY OF THE INVENTION

A first feature of this invention is adapted to be embodied to a self-energized disk type brake for braking the rotation of an associated rotor. The brake includes a brake pad and a supporting member. The brake pad is movable relative to the supporting member in the first direction for bringing the brake pad into braking relationship with an associated braking surface of the rotor and in a second direction parallel to the direction of movement of the associated rotor braking surface. Actuation means are provided to move the brake pad in the first direction for braking rotation of the associated rotor. A self-energizing member is operatively interposed between the supporting member and the brake pad. The self-energizing member is pivoted about a pivot axis in response to movement of the brake pad in the second direction. Pivotal movement of the self-energizing member about its pivot axis is effective to move the brake pad in the first direction for generating a self-energizing force upon the brake pad. The operative connection between the self-energizing member and the brake pad is defined by a surface of the self-energizing member that is curved about an axis coincident with the pivot axis of the self-energizing member for transmitting the forces between the brake pad and the self-energizing member through the same point on the brake pad regardless of the angular position of the self-energizing member.

Another feature of this invention is adapted to be embodied in a self-energized disk type brake for braking the rotation of an associated rotor. The brake includes a brake pad and a supporting member. The brake pad is movable relative to the supporting member in the first direction for bringing the brake pad into braking relationship with an associated braking surface of the rotor and in a second direction parallel to the direction of movement of the associated rotor braking surface. Actuating means are provided to move the brake pad in the first direction for braking rotation of the associated rotor. The supporting member defines a pocket comprised of spaced facing surfaces. A self-energizing member is received in the pocket and has a first portion engaged with one of the supporting member surfaces and a second portion engaged with the brake pad for pivotal movement of the self-energizing member about the one supporting member surface upon the movement of the brake pad in the second direction. Pivotal movement of the self-energizing member about the one supporting member surface is effective to move the brake pad in the first direction for generating a self-energizing force. A coil spring encircles the self-energizing member and is engaged at opposite ends with the self-energizing member and with the other surface of the supporting member for yieldably resisting pivotal movement of the self-energizing member and for exerting and restoring force upon it.

Yet another feature of the invention is adapted to be embodied in an automatic adjusting mechanism for a disk brake or the like. The brake includes a supporting member, a supported member and an actuator carried by the supported member and moveable relative thereto for actuating a brake pad. An adjusting member has a threaded connection to the supporting member. The supported member is engageable with the adjusting member for defining the at-rest position of the associated brake pad. Means rotate the adjusting member relative to the supporting member about the threaded connection for adjusting the at-rest position of the brake pad in response to overtravel of the actuator indicative of excessive wear of the lining of the brake pad.

BRIEF DESCRIPTION OF THE DRAWINGS

FIG. 2 is an end elevational view of the brake shown in FIG. 1.

FIG. 3 is a side elevational view, with a portion shown in section, of the brake taken in the direction of the arrow 3 in FIG. 2.

FIG. 4 is a view taken in the direction of the arrow 4 in FIG. 3.

DETAILED DESCRIPTION OF THE PREFERRED EMBODIMENT

Figure 1:
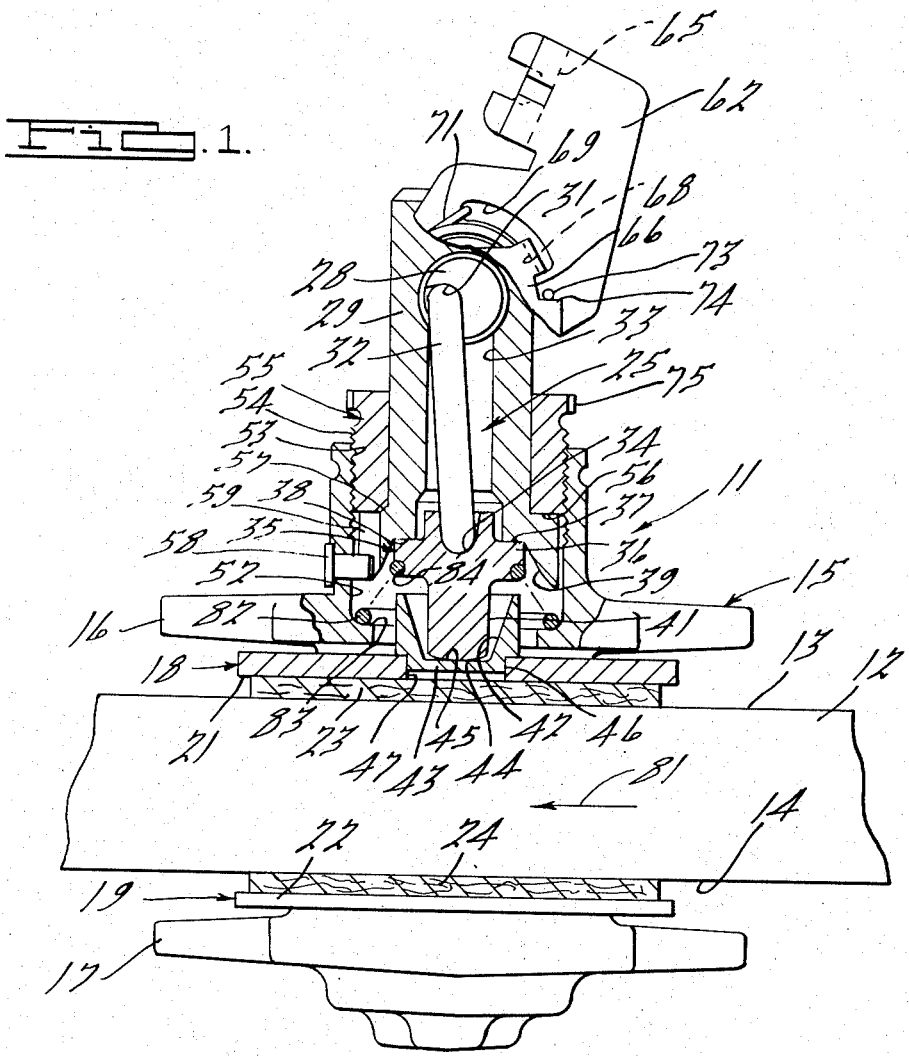
FIG. 1 is a plan view, with portions shown in section, of a disk parking brake embodying this invention.

A disk type parking brake embodying this invention is identified generally by the reference numeral 11. The brake 11 is adapted to cooperate with a rotor 12 that is mounted for rotation about an axis in any known manner. The rotor 12 has oppositely facing annular braking surfaces 13 and 14. In addition to the parking brake assembly 11, a service brake assembly (not shown) may also be provided for braking the rotation of the rotor 12.

The brake assembly 11 includes a caliper, indicated generally by the reference numeral 15, having legs 16 and 17 that are juxtaposed to the rotor braking surfaces 13 and 14, respectively. A bridge portion 20 extends across the outer periphery of the rotor 12 and integrally connects the legs 16 and 17. The caliper 15 is supported for sliding movement in a direction parallel to the axis of rotation of the rotor 12 in any known manner.

A pair of brake pads, indicated generally by the reference numerals 18 and 19 are interposed between the caliper legs 16 and 17 and their respective rotor braking surfaces 13 and 14. Each of the brake pads 18 and 19 has respective backing plates 21 and 22 and attached frictional linings 23 and 24.

An actuating mechanism indicated generally by the reference numeral 25 is carried by the caliper leg 16 for directly actuating the brake pad 18 into axial engagement with the rotor braking surface 13. Simultaneously, a reactive force is exerted on the caliper 15 for sliding it in an axial direction to bring the brake pad 19 into frictional engagement with the rotor braking surface 14. For this latter purpose, the brake pad 19 is affixed both axially and circumferentially relative to the caliper leg 17. Both radial and circumferential support for the brake pad 19 is provided by an offset flange 26 of the backing plate 22 that extends through a complementary shaped opening 27 of the caliper leg 17. (FIG. 3)

The actuating mechanism 25 includes an actuating shaft 28 that is journaled in a supported member 29 for rotation about an axis that extends transversely to the axis of rotation of the rotor 12. The actuating shaft 28 is formed with a pocket 31 that receives one end of a pin 32. The pin 32 extends through a cylindrical opening 33 of the supported member 29. The opposite end of the pin 32 is received in a complementary socket opening 34 of a tilting member, indicated generally by the reference numeral 35. The tilting member 35 is generally cylindrical in shape and has an enlarged portion 36 that defines an outwardly facing shoulder 37. The shoulder 37 is normally engaged with a complementary shoulder 38 formed at the base of a pocket 39 provided at the end of the supporting member 29. As will become more apparent as this description proceeds, the member 35 is adapted to tilt or pivot about the surface 38 to provide a self-energizing action.

The tilting member 35 has a cylindrical portion 41 that extends into a conical recess 42 of a cup shaped member 43. The inner end of the cylindrical portion 41 is formed with a spherical surface 44 that engages a flat surface 45 formed at the bottom of the recess 42. The center of curvature of the surface 44 is coincident with the pivotal axis about which the tilting member 35 pivots as will become more apparent. The cup shaped member 43 has a cylindrical extension 46 that is received within a cylindrical bore 47 formed centrally of the backing plate 21 of the brake pad 18. This connection insures that the cup-shaped member 43 will move with the brake pad 18 in both an axial and in a circumferential direction.

The brake pad 18 is supported for limited circumferential movement by means that include an outwardly extending flange 49 (FIG. 3) of the backing plate 21. The flange 49 extends into a recess 51 formed in the caliper leg 16. The cooperation between the flange 49 and recess 51 provides radial support for the brake pad 18 while allowing the brake pad 18 to move axially and circumferentially relative to the caliper leg 16.

The caliper leg 16 is formed with a cylindrical extension that is bored at 52. The outer end of the bore 52 is threaded as at 53, to receive the complementary threads 54 of an adjusting member, indicated generally by the reference numeral 55. The inner end of the adjusting member 55 defines a shoulder 56 that engages a shoulder 57 of the supported member 29 so as to axially position the supported member 29 and the mechanism carried by it relative to the caliper 15. A pin 58 is staked into the caliper leg 16 and extends into an elongated slot or keyway 59 formed in the supported member 29. This construction permits axial movement of the supported member 29 but prevents its rotation.

An automatic adjusting mechanism, indicated generally by the reference numeral 61, is provided for rotating the adjusting member 55 and for adjusting the at-rest position of the brake assembly 11 in response to wear of the frictional linings 23 and 24. This adjusting mechanism includes an actuating lever 62 having an opening 63 that is press fit on to an enlarged diameter portion 64 of the actuating shaft 28. The actuating lever 62 is formed with an offset tang 65 that is adapted to provide a connection to a wire actuator (not shown) for operating the brake 11 by pivotally moving the actuating lever 62 and the actuating shaft 28.

An adjusting lever 66 is supported for rotation and axial movement upon a reduced diameter portion 67 of the actuating shaft 28. The adjusting lever 66 has an offset tang 68 that extends into an enlarged arcuate slot 69 formed in the actuating lever 62. A tortional spring 71 encircles the shaft portion 67 and has one of its ends 72 offset and extending into the slot 69. The other end 73 of the spring 71 engages a flat 74 on the adjusting lever 66 so as to exert a bias on the adjusting lever 66 tending to rotate in a clockwise direction until the tang 68 engages one end of the slot 69.

The adjusting member 55 is formed, at its outer end, with ratchet teeth 75. The teeth 75 are engaged by a pawl 76 formed integrally with the adjusting lever 66. The adjusting lever as has been noted, is mounted for sliding movement along the shaft portion 67. A coil spring 77 encircles the shaft portion 67 and engages the adjusting lever 66 and a washer 78. The washer 78 is held axially in position by a cotter key 79. The spring 77 holds the pawl 76 in engagement with the ratchet teeth 75 and yieldably resists the sliding movement of the adjusting lever 66 on the shaft portion 67.

OPERATION

The drawings illustrate the brake assembly 11 in its released position. In this position the frictional linings 23 and 24 of the brake pads 18 and 19 will only have a light rubbing contact with the rotor braking surfaces 13 and 14. When it is desired to operate the brake 11, the actuating lever and actuating shaft 28 are pivoted in a counterclockwise direction as viewed in FIGS. 1 and 4. This rotation will exert an axial force on the pin 32, which is transmitted through the tilting member 35 into axial movement of the brake pad 18. Simultaneously, the caliper 15 will slide in an axial direction due to the reactive force to bring the frictional lining 24 of the brake pad 19 into engagement with the rotor braking surface 14. The brake pad 19 is held against circumferential movement, as has been noted, as is the caliper 15. The caliper 15 is held against rotation or circumferential movement in any known manner. The mechanism for accomplishing this may be the same mechanism that slidably supports the caliper 15.

The brake pad 18, however, is supported for limited circumferential movement. The direction of movement will depend upon direction of rotation of the rotor 12. Assuming that the rotor 12 is rotating in the direction of the arrow 81 (FIG. 1) the initial movement of the brake pad 18 will be in the same direction. The cup-shaped member 43 will follow the brake pad and will cause the tilting member 35 to pivot about the surface 38. This pivotal movement causes a further force to be exerted in an axial direction upon the brake pad 18 which further force provides a self-energizing or servo action. Since the surface 44 of the tilting pin 35 is curved about a point that is coincident with the pivot axis, the force exerted on the brake pad 18 will always pass through the same point regardless of the pivotal position of the member 35.

Because of the servo action, it is desirable to provide a return spring for release of the brake pads 18 and 19 from their frictional engagement with the rotor braking surfaces 13 and 14, when the brake is released. For this purpose, a conical return spring 82 encircles the tilting member 35. The return spring 82 engages the surface 83 of the caliper 15 formed at the base of the bore 52 and a shoulder 84 formed on the tilting member portion 36 opposite to its shoulder 37. The return spring 82 yieldably resists pivotal movement of the tilting member 35 and returns it to its normal position when the brake is released.

When the actuating lever 62 is rotated to operate the brake assembly 11, the adjusting pawl 66 (FIG. 4) will be rotated in the same counterclockwise direction because of the engagement of the tang 68 with the end of the slot 69. The degree of pivotal movement of the adjusting lever 66 and operating lever 62 will be dependent upon the degree of axial movement necessary to bring the frictional linings 23 and 24 into tight engagement with the rotor braking surfaces 13 and 14. Normally, the degree of angular movement will be insufficient to cause the pawl 76 to register with the next of the teeth 75 of the adjusting member 55. If sufficient wear has occurred, however, the pawl 76 will engage the next of the teeth 75.

Assuming this latter condition to be met, return movement of the actuating lever 62 to the released position will permit the end of the slot 69 to move away from the tang 68. The spring 71, however, will force the adjusting lever 66 to follow the movement of the lever 62. The action of the spring 71 will further cause rotation of the adjusting member 55 causing turning of its threaded connection with the caliper 15. This rotation axially advances the supporting member 29 and all of the associated components carried by it. As has been previously noted, this causes the brake pads 18 and 19 to move closer to the rotor braking surfaces 13 and 14 to compensate for the wear of the frictional linings 23 and 24. If for some reason the adjusting mechanism 61 malfunctions, no damage will result since the application of the force is limited to that provided for by the spring 71.

It is to be understood that the foregoing description is that of a preferred embodiment of the invention. Various changes and modifications may be made without departing from the spirit and scope of the invention as defined by the appended claims.

I claim:

1. A self-energized disk type brake for braking the rotation of an associated rotor comprising a brake pad, a supporting member, said brake pad being movable relative to said supporting member in a first direction for bringing said brake pad into braking relationship with an associated braking surface of the rotor and a second direction parallel to the direction of movement of the associated rotor braking surface, actuating means for moving said brake pad in said first direction for braking the rotation of the associated rotor, and a self-energizing member operatively interposed between said supporting member and said brake pad, said self-energizing member being pivotal about a pivot axis in response to movement of said brake pad in said second direction, pivotal movement of said self-energizing member about said second axis being effective to move said brake pad in said first direction for generating a self-energizing force upon said brake pad, the operative connection between said self-energizing member and said brake pad being defined by a curved surface of said self-energizing member, the center of curvature of said surface being coincident with the pivot axis of said self-energizing member for transmitting the forces between said self-energizing member and said brake pad through the same point on said brake pad regardless of angular position of said self-energizing member.

2. A disk type brake as set forth in claim 1 wherein the actuating means applies a force to the brake pad through the energizing member.

3. A disk type brake as set forth in claim 2 wherein the pivot axis of the self-energizing member is defined by the connection between the self-energizing member and a component of the actuating means.

4. A disk type brake as set forth in claim 3 wherein the component of the actuating means comprises an elongated pin.

5. A disk type brake as set forth in claim 1 wherein the supporting member defines a pocket in which the self-energizing member is positioned.

6. A disk type brake as set forth in claim 5 further including a coil return spring contained within the pocket and acting against the self-energizing member for urging said self-energizing member to a normal position.

7. A disk type brake as set forth in claim 5 further including means for adjusting the position of the self-energizing member to adjust the at rest position of the brake pad.

8. A disk type brake as set forth in claim 7 wherein the means for adjusting the self-energizing member is automatically operative in response to a predetermined degree of wear of the lining of the brake pad.

9. A disk type brake as set forth in claim 8 wherein the automatic adjusting means includes means responsive to over-travel of the actuating means.

10. A disk type brake as set forth in claim 9 wherein the actuating means includes an elongated pin having a pivotal connection to the self-energizing member for defining the pivot axis of said self-energizing member and for actuating the brake pad for exerting a force on the self-energizing member in the first direction.

11. A self-energizing disk brake assembly for braking the rotation of an associated rotor comprising a brake pad, a supporting member, said brake pad being movable relative to said supporting member in a first direction for bringing said brake pad into braking relationship with an associated braking surface of the rotor and in a second direction parallel to the direction of movement of the associated rotor braking surface, actuating means for moving said brake pad in said first direction for braking the rotation of the associated rotor, said supporting member defining a pocket comprised of spaced facing surfaces, a self-energizing member received in said pocket and having a first portion engaged with one of said supporting member surfaces and a second portion engaged with said brake pad for pivotal movement of said energizing member relative to said one supporting member surface upon movement of said brake pad in said second direction, pivotal movement of said self-energizing member relative to said one supporting member surface being effective to move said brake pad in said first direction for exerting a self-energizing force thereupon, and a coil spring encircling said self-energizing member and engaged at its opposite ends with said self-energizing member and with the other surface of said supporting member for yieldably resisting pivotal movement of said self-energizing member and for exerting a restoring force thereupon.

12. A disk brake assembly as set forth in claim 11 wherein the self-energizing member has a generally cylindrical shape and defines a surface engaged by one end of the coil spring and which surface faces the other surface of the supporting member.

13. A disk brake assembly as set forth in claim 12 wherein the actuating means acts upon the self-energizing member and through the self-energizing member upon the brake pad.

14. A disk brake assembly as set forth in claim 13 wherein the self-energizing member has a surface curved about its pivot axis engaged with the brake pad for transmitting actuating forces to the brake pad.

* * * * *